United States Patent
Okuda et al.

(10) Patent No.: US 11,231,270 B2
(45) Date of Patent: Jan. 25, 2022

(54) OPTICAL MEASURING DEVICE

(71) Applicant: OMRON Corporation, Kyoto (JP)

(72) Inventors: Takahiro Okuda, Kyoto (JP); Mariko Marukawa, Fukuchiyama (JP); Hisayasu Morino, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 86 days.

(21) Appl. No.: 16/223,038

(22) Filed: Dec. 17, 2018

(65) Prior Publication Data

US 2019/0277621 A1 Sep. 12, 2019

(30) Foreign Application Priority Data

Mar. 12, 2018 (JP) .............................. JP2018-044129

(51) Int. Cl.
*G01B 9/02* (2006.01)
*G01B 11/06* (2006.01)
*G01B 11/24* (2006.01)

(52) U.S. Cl.
CPC ..... *G01B 9/02042* (2013.01); *G01B 9/02056* (2013.01); *G01B 11/0608* (2013.01); *G01B 11/2441* (2013.01); *G01B 2210/50* (2013.01)

(58) Field of Classification Search
CPC ............ G01B 11/0608; G01B 11/2441; G01B 2210/50; G01B 9/02042; G01B 9/02056; G01B 11/24; G01B 9/02; G01J 3/28
See application file for complete search history.

(56) References Cited

U.S. PATENT DOCUMENTS

| 9,995,624 | B2* | 6/2018 | Morino | .................. G01B 11/24 |
| 10,247,602 | B2* | 4/2019 | Marukawa | ............ G01J 3/0208 |
| 10,520,296 | B2* | 12/2019 | Morino | .............. G02B 6/29389 |
| 10,551,171 | B2* | 2/2020 | Morino | .................. G01N 21/27 |

(Continued)

FOREIGN PATENT DOCUMENTS

| CN | 103673887 | 3/2014 |
| CN | 104165582 | 11/2014 |

(Continued)

OTHER PUBLICATIONS

"Search Report of Europe Counterpart Application", dated Apr. 11, 2019, p. 1-p. 7.

(Continued)

*Primary Examiner* — Violeta A Prieto
(74) *Attorney, Agent, or Firm* — JCIPRNET (57) ABSTRACT

The optical measuring device includes a light source that outputs light of a plurality of wavelengths; a sensor head including a conversion lens that converts light incident via a light guide part, which includes a plurality of cores, into parallel light, and an objective lens that irradiates the light in which chromatic aberration is generated to a measurement object; and a spectroscope that acquires reflected light reflected by the measurement object and condensed by the sensor head via the light guide part and measures a spectrum of the reflected light. In the sensor head, a shield that shields light is arranged between the conversion lens and the objective lens to inhibit light emitted from one core among the plurality of cores included in the light guide part from entering cores other than the one core as the reflected light.

12 Claims, 11 Drawing Sheets

(56) References Cited

U.S. PATENT DOCUMENTS

| | | | |
|---|---|---|---|
| 2008/0151253 A1* | 6/2008 | Korner | G01B 9/02057 356/451 |
| 2011/0286006 A1 | 11/2011 | Xie | |
| 2017/0160130 A1* | 6/2017 | Morino | G01B 11/0608 |
| 2017/0276475 A1* | 9/2017 | Morino | G01B 11/24 |
| 2018/0216933 A1* | 8/2018 | Sugiyama | B23Q 17/2428 |
| 2018/0238678 A1* | 8/2018 | Mizutani | G01B 11/026 |
| 2018/0252582 A1* | 9/2018 | Furukawa | G02B 6/06 |
| 2018/0259390 A1* | 9/2018 | Marukawa | G01B 11/026 |
| 2019/0101375 A1* | 4/2019 | Morino | G01B 11/026 |
| 2019/0219695 A1* | 7/2019 | Kajii | G01C 3/08 |
| 2019/0285400 A1* | 9/2019 | Takashima | G01N 21/01 |
| 2019/0346258 A1* | 11/2019 | Morino | G01N 21/27 |

FOREIGN PATENT DOCUMENTS

| | | |
|---|---|---|
| CN | 104520668 | 4/2015 |
| CN | 105300278 | 2/2016 |
| CN | 107063127 | 8/2017 |
| EP | 2708934 | 3/2014 |
| EP | 3176538 | 6/2017 |
| JP | 2014055920 | 3/2014 |
| JP | 2017102067 | 6/2017 |
| JP | 2017173159 | 9/2017 |
| KR | 20140035795 | 3/2014 |

OTHER PUBLICATIONS

"Office Action of Korea Counterpart Application," with English translation thereof, dated Jun. 11, 2019, p. 1-p. 9.

"Office Action of Japan Counterpart Application", dated Feb. 18, 2021, with English translation thereof, p. 1-p. 6.

"Office Action of China Counterpart Application", dated Aug. 4, 2020, with English translation thereof, p. 1-p. 15.

* cited by examiner

OPTICAL MEASURING DEVICE

CROSS-REFERENCE TO RELATED APPLICATION

This application claims the priority benefit of Japan Application No. 2018-044129, filed on Mar. 12, 2018. The entirety of the above-mentioned patent application is hereby incorporated by reference herein and made a part of this specification.

BACKGROUND

Technical Field

The disclosure relates to an optical measuring device.

Description of Related Art

Conventionally, an optical measuring device capable of measuring the surface shape of a measurement object, etc. by a white confocal method is used.

For example, the optical measuring device described in the following Patent Document 1 includes a light source that generates irradiation light having a plurality of wavelength components; an optical system that generates axial chromatic aberration in the irradiation light from the light source and receives reflected light from a measurement object at least a part of which is arranged on an extension line of the optical axis; a light receiving part including a spectroscope that divides the reflected light received by the optical system into each wavelength component, and a detector in which a plurality of light receiving elements are one-dimensionally arranged corresponding to the spectral direction of the spectroscope; a light guide part that includes a plurality of cores optically connecting the optical system and the light receiving part; and a processing part that calculates the distance from the optical system to the measurement object based on values detected by the plurality of light receiving elements of the light receiving part.

RELATED ART

Patent Document(s)

[Patent Document 1] Japanese Laid-open No. 2017-102067

Problems to be Solved

In the optical measuring device described in Patent Document 1, an optical fiber including a plurality of cores is provided, and as the interval between adjacent cores becomes narrower, the following phenomenon (hereinafter also referred to as "crosstalk") may occur. That is, light of a wavelength outside a confocal point reflected from the measurement object may enter the optical fiber having the confocal point. Therefore, in the optical fiber, the interval between adjacent cores and the arrangement of the cores are set so as to reduce crosstalk.

However, it is required to detect the position of the measurement object with even more sufficient accuracy by further reducing the crosstalk.

Therefore, the disclosure provides an optical measuring device with further improved detection accuracy of the position of a measurement object.

SUMMARY

An optical measuring device according to an embodiment of the disclosure includes a light source, a sensor head, and a spectroscope. The light source outputs light of a plurality of wavelengths. The sensor head includes a conversion lens that converts the light incident via a light guide part, which includes a plurality of cores, into parallel light, and an objective lens that irradiates the light in which chromatic aberration is generated to a measurement object. The spectroscope acquires reflected light reflected by the measurement object and condensed by the sensor head via the light guide part and measures a spectrum of the reflected light. In the sensor head, a shield that shields light is arranged between the conversion lens and the objective lens to inhibit light emitted from one core among the plurality of cores included in the light guide part from entering cores other than the one core as the reflected light.

DESCRIPTION OF THE EMBODIMENTS

Means for Solving the Problems

An optical measuring device according to an embodiment of the disclosure includes a light source, a sensor head, and a spectroscope. The light source outputs light of a plurality of wavelengths. The sensor head includes a conversion lens that converts the light incident via a light guide part, which includes a plurality of cores, into parallel light, and an objective lens that irradiates the light in which chromatic aberration is generated to a measurement object. The spectroscope acquires reflected light reflected by the measurement object and condensed by the sensor head via the light guide part and measures a spectrum of the reflected light. In the sensor head, a shield that shields light is arranged between the conversion lens and the objective lens to inhibit light emitted from one core among the plurality of cores included in the light guide part from entering cores other than the one core as the reflected light.

According to this embodiment, in the sensor head, the shield that shields light is arranged between the conversion lens and the objective lens to inhibit the light emitted from the one core among the plurality of cores included in the light guide part from entering the cores other than the one core as the reflected light. Since crosstalk can be further reduced, it is possible to further improve the detection accuracy of the position of the measurement object.

In the optical measuring device, the shield may be arranged corresponding to an arrangement of the plurality of cores.

According to this embodiment, even if the plurality of cores are arranged in various patterns, the shield can be appropriately arranged for each pattern.

In the optical measuring device, the sensor head may accommodate a diffraction lens including a diffraction surface formed with a diffraction pattern, which is for generating chromatic aberration in the incident light along a direction of an optical axis, between the conversion lens and the objective lens, and the shield may be arranged on a surface located on a side opposite to the diffraction surface in the diffraction lens.

According to this embodiment, since the shield is arranged on the surface located on the side opposite to the diffraction surface in the diffraction lens and, it is not necessary to significantly change the original configuration of the optical measuring device to arrange the shield, it is possible to further improve the detection accuracy of the position of the measurement object at low costs.

In the optical measuring device, the shield may be arranged on the surface in a four-way point pattern, a cross pattern, or a ring pattern.

According to this embodiment, the flexibility with respect to the arrangement of the shield is increased.

In the optical measuring device, the light may be a white light.

The optical measuring device may be a confocal measuring device that measures a displacement of the measurement object by using a confocal optical system.

Effects

According to the disclosure, by further reducing crosstalk, it is possible to provide an optical measuring device with further improved detection accuracy of the position of the measurement object.

Embodiments of the disclosure will be described with reference to the accompanying drawings. In the drawings, elements with the same reference numerals have the same or similar configurations.

Figure 1:
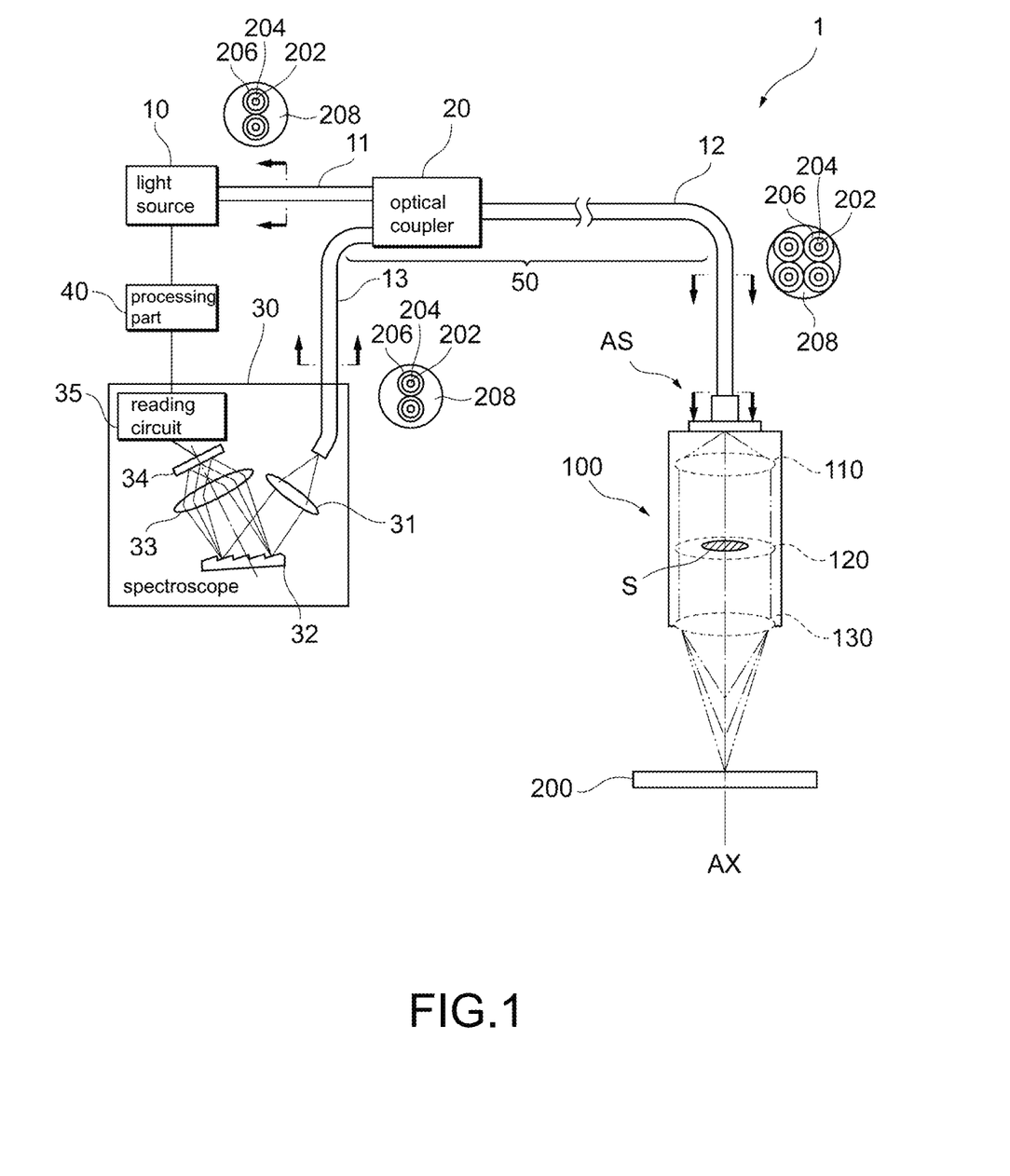
FIG. 1 is a schematic view of a confocal measuring device according to an embodiment of the disclosure.

FIG. 1 is a schematic view of a confocal measuring device according to an embodiment of the disclosure. As shown in FIG. 1, a confocal measuring device 1 (optical measuring device) according to the present embodiment is a device that measures the position of a measurement object 200 and exemplarily includes a light source 10, a first optical fiber 11, a second optical fiber 12, a third optical fiber 13, an optical coupler 20, a spectroscope 30, a processing part 40, and a sensor head 100. A light guide part 50 is exemplarily constituted by the first optical fiber 11, the second optical fiber 12, the third optical fiber 13, and the optical coupler 20.

The light source 10 outputs light of a plurality of wavelengths to the first optical fiber 11. The light source 10 may adjust the light amount based on the command of the processing part 40. The light may be a white light. The first optical fiber 11 may be any optical fiber and may be, for example, a graded index optical fiber having a core diameter of 50 µm. The first optical fiber 11 may be connected to a fiber having a smaller core diameter before being connected to the optical coupler 20.

The first optical fiber 11 and the third optical fiber 13 are each an optical fiber having two cores 202, and as the sectional structure, two sets of the core 202, a clad 204, and a coating 206 are arranged and an exterior 208 is provided around the sets. On the other hand, the second optical fiber 12 is an optical fiber having four cores 202, and as the sectional structure, four sets of the core 202, the clad 204, and the coating 206 are arranged and the exterior 208 is provided around the sets. However, the number of the cores of each optical fiber is not particularly limited as long as it is plural.

The optical coupler 20 is optically connected with the first optical fiber 11, the second optical fiber 12, and the third optical fiber 13 and is constituted by, for example, a 2×2 star coupler (2 inputs and 2 outputs/2 inputs and 2 outputs). For example, the optical coupler 20 transmits the light incident from one core of the first optical fiber 11 to two cores of the second optical fiber 12, mixes the light incident from the two cores of the second optical fiber 12 and then divides the light, and transmits the light to the first optical fiber 11 and the third optical fiber 13, respectively. Similarly, for example, the optical coupler 20 transmits the light incident from the other one core of the first optical fiber 11 to the other two cores of the second optical fiber 12, mixes the light incident from the other two cores of the second optical fiber 12 and then divides the light, and transmits the light to the first optical fiber 11 and the third optical fiber 13, respectively.

The sensor head 100 is connected to the second optical fiber 12, accommodates a diffraction lens 120 that generates chromatic aberration in the incident white light along the direction of an optical axis AX, and irradiates the light in which the chromatic aberration is generated to the measurement object 200. Also, the sensor head 100 exemplarily further accommodates a conversion lens 110 that converts the white light emitted from an end face AS of the second optical fiber 12 into parallel light, and an objective lens 130 that converges the light in which the chromatic aberration is generated by the diffraction lens 120 onto the measurement object 200. For example, a lens including the diffraction lens 120 and the conversion lens 110 may be called a collimator lens.

In the sensor head 100, in order to prevent the light emitted from one core among the plurality of cores of the second optical fiber 12 from entering cores other than the one core as reflected light, a shield S that shields light is arranged between the conversion lens 110 and the objective lens 130. For example, the shield S is arranged corresponding to the arrangement of the plurality of cores in the second optical fiber 12. Specific examples of the arrangement of the shield S will be described later.

The shield S includes a member capable of shielding light to reduce crosstalk. For example, the shield S may be constituted by a member including a material that does not transmit light or hardly transmits light. For example, the shield S may be a pigment, an ink, etc.

The light reflected from the surface of the measurement object 200 is collected by the objective lens 130, passes through the diffraction lens 120, is condensed by the conversion lens 110, and is returned to the cores via the end face AS of the second optical fiber 12. The reflected light incident to the second optical fiber 12 is transmitted to the third optical fiber 13 via the optical coupler 20 and is input to the spectroscope 30. Moreover, the reflected light incident to the second optical fiber 12 is also transmitted to the first optical fiber 11 via the optical coupler 20 but is terminated at the light source 10.

The spectroscope 30 is connected to the third optical fiber 13, acquires the reflected light that is reflected by the measurement object 200 and condensed by the sensor head 100 via the second optical fiber 12, the optical coupler 20, and the third optical fiber 13, and measures the spectrum of the reflected light. The spectroscope 30 includes a first lens 31 that collects the reflected light emitted from the third optical fiber 13, a diffraction grating 32 that disperses the reflected light, a second lens 33 that collects the dispersed reflected light, a light receiving element 34 that receives the dispersed reflected light, and a reading circuit 35 that reads the light reception signal of the light receiving element 34. The reading circuit 35 reads the wavelength and light amount of the received light based on the light reception signal of the light receiving element 34. The read wavelength and light amount of the light are read by the processing part 40 into the position of the measurement object 200.

The confocal measuring device 1 can measure the position of the measurement object 200 at a resolution of tens of nanometers (nm) if the sensor head 100 is in a stationary state. In order to further improve the measurement accuracy, it is necessary to further reduce the core diameter of the second optical fiber 12 and the third optical fiber 13 to limit the wavelength of the reflected light incident to the second optical fiber 12 so that a sharper peak can be detected by the spectroscope 30.

Figure 2:
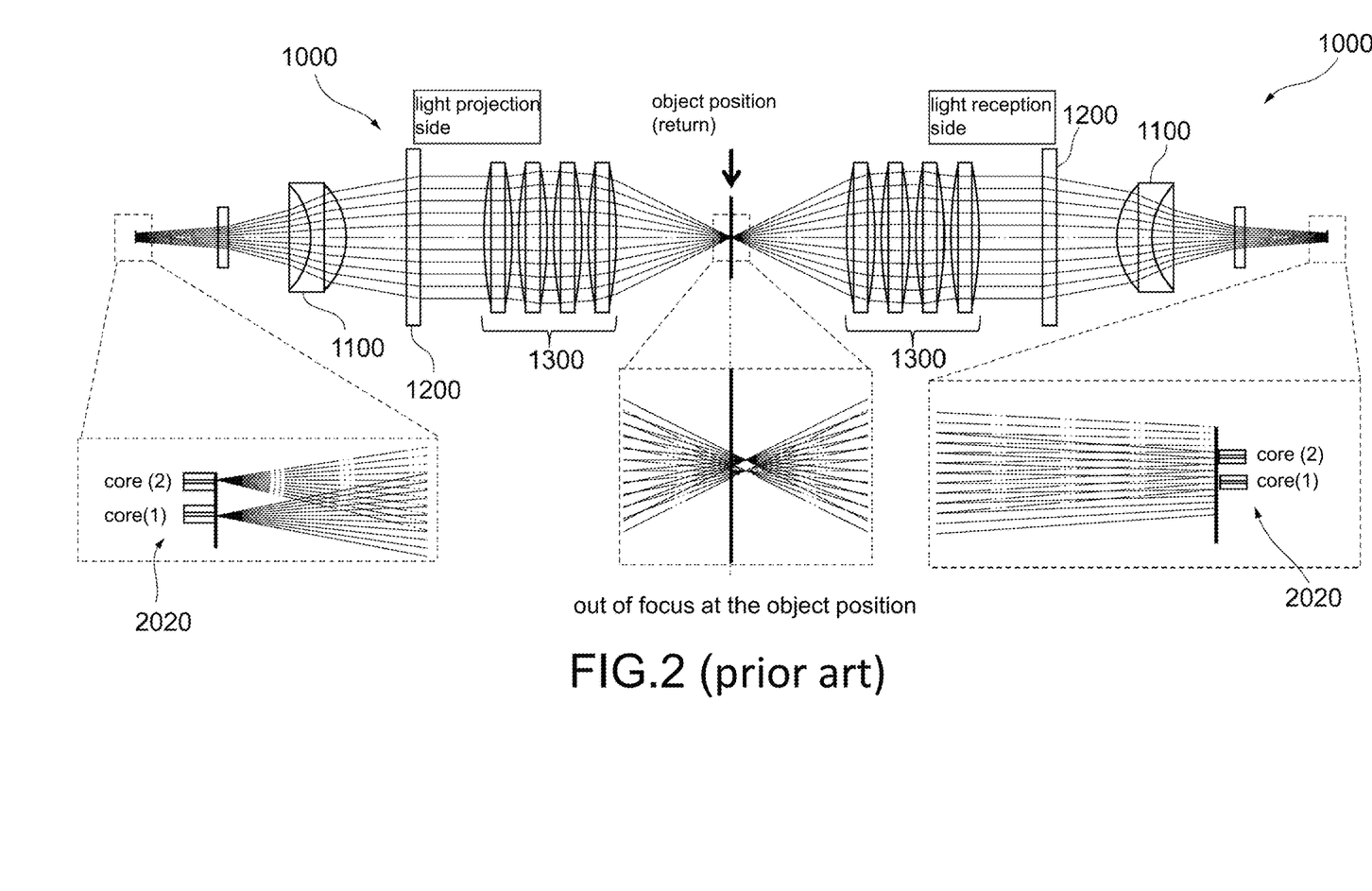
FIG. 2 is a schematic view of a sensor head according to a conventional example and a conceptual view showing an occurrence condition of crosstalk.
Figure 3:
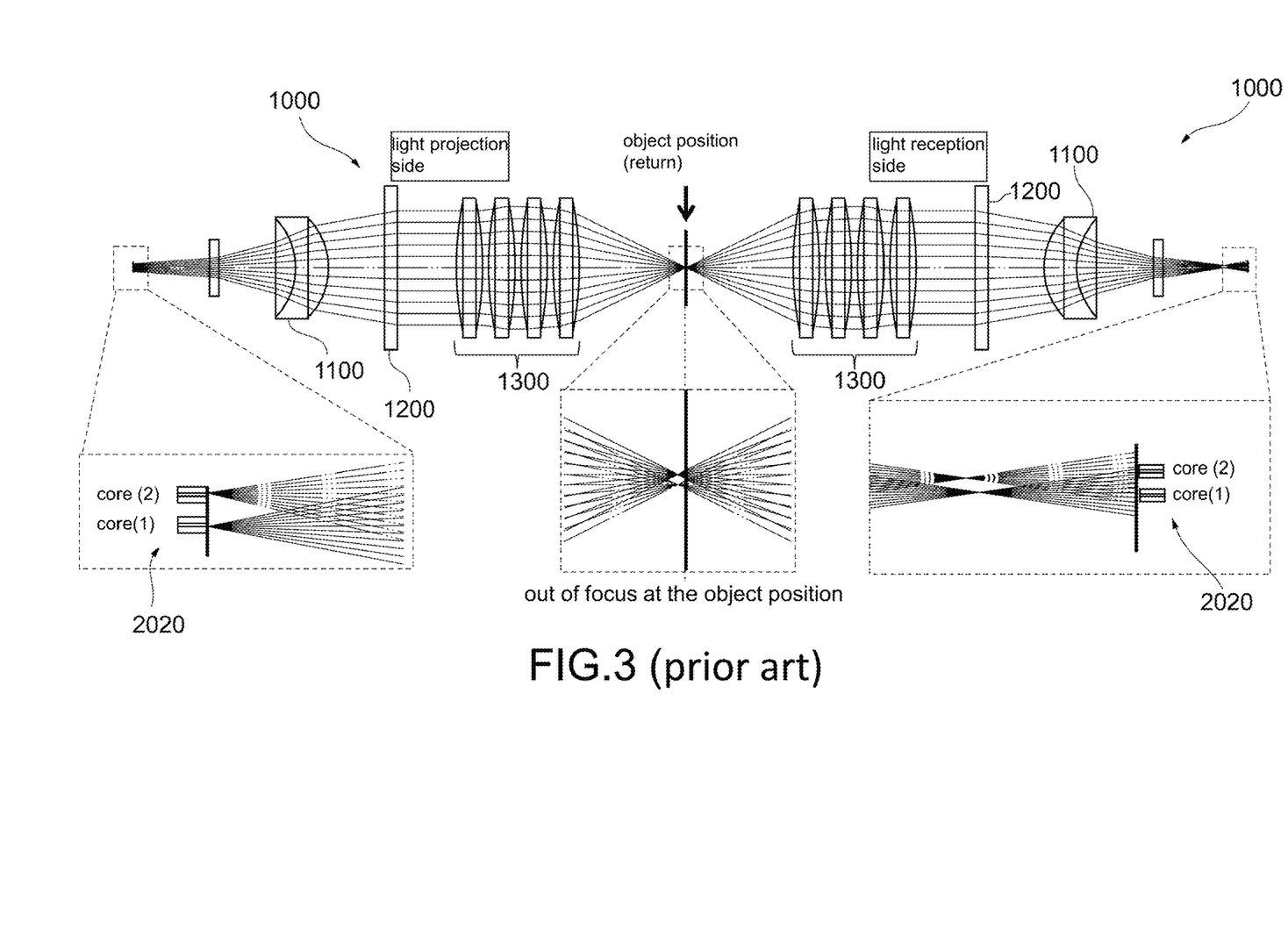
FIG. 3 is a schematic view of the sensor head according to the conventional example and a conceptual view showing an occurrence condition of crosstalk.
Figure 4:
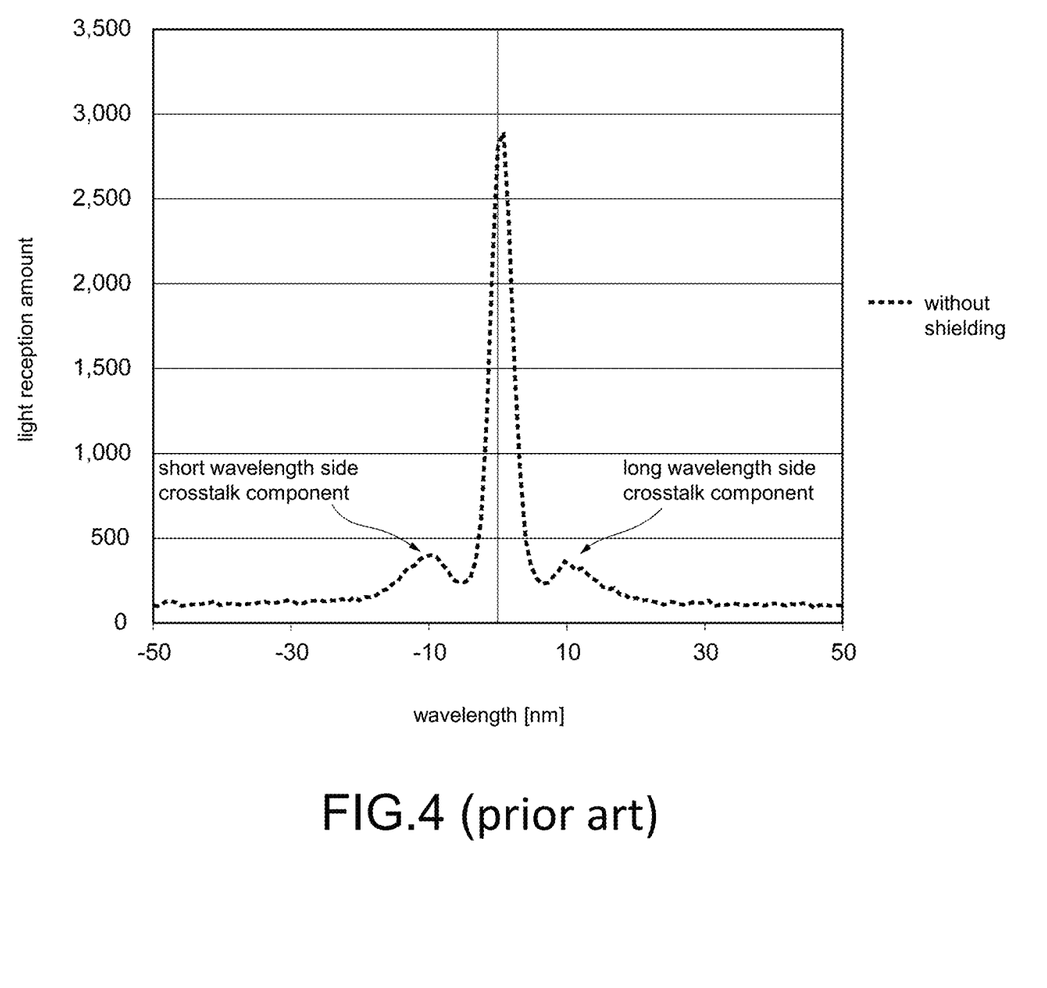
FIG. 4 is a view showing an example of the result of evaluation of the amount of crosstalk occurring in the confocal measuring device according to the conventional example.

With reference to FIG. 2 to FIG. 4, occurrence conditions of crosstalk in the confocal measuring device according to a conventional example will be described. FIG. 2 is a schematic plan view of a sensor head 1000 according to a conventional example and a conceptual view showing an occurrence condition of crosstalk on the short wavelength side. FIG. 3 is a schematic plan view of the sensor head 1000 according to the conventional example and a conceptual view showing an occurrence condition of crosstalk on the long wavelength side. For ease of illustration, FIG. 2 and FIG. 3 show an example of an irradiation condition of light to an object on the left side of each figure and show an example of a light reception condition of light at the time of reflecting from the object on the right side of each figure.

As shown in FIG. 2 and FIG. 3, white light emitted from an end face of each of cores 2020 of an optical fiber according to the conventional example is converted into parallel light by a conversion lens 1100, and the light in which chromatic aberration is generated by a diffraction lens 1200 is converged by an objective lens 1300 onto the measurement object. Then, the light reflected from the measurement object returns to each of the cores 2020 via the objective lens 1300, the diffraction lens 1200, and the conversion lens 1100. For example, a lens including the diffraction lens 1200 and the conversion lens 1100 may be called a collimator lens.

Here, as shown in FIG. 2 and FIG. 3, since the focal point of each light is shifted at the position where the measurement object is arranged, for example, crosstalk in which the white light emitted from the core (1) enters the core (2) as a reflected light, and conversely, the white light emitted from the core (2) enters the core (1) as a reflected light occurs.

FIG. 4 is a view showing an example of the result of evaluation of the amount of crosstalk occurring in the confocal measuring device according to the conventional example. As shown in FIG. 4, it can be confirmed that crosstalk occurs on both the long wavelength side and the short wavelength side in the confocal measuring device according to the conventional example in which the shield is not included.

Therefore, the present embodiment provides an optical measuring device in which, by arranging a shield that shields light at an appropriate position, crosstalk can be further reduced, and detection accuracy of the position of the measurement object is further improved. Arrangement examples of the shield will be described in detail below with reference to FIG. 5 to FIG. 7.

Figure 5:
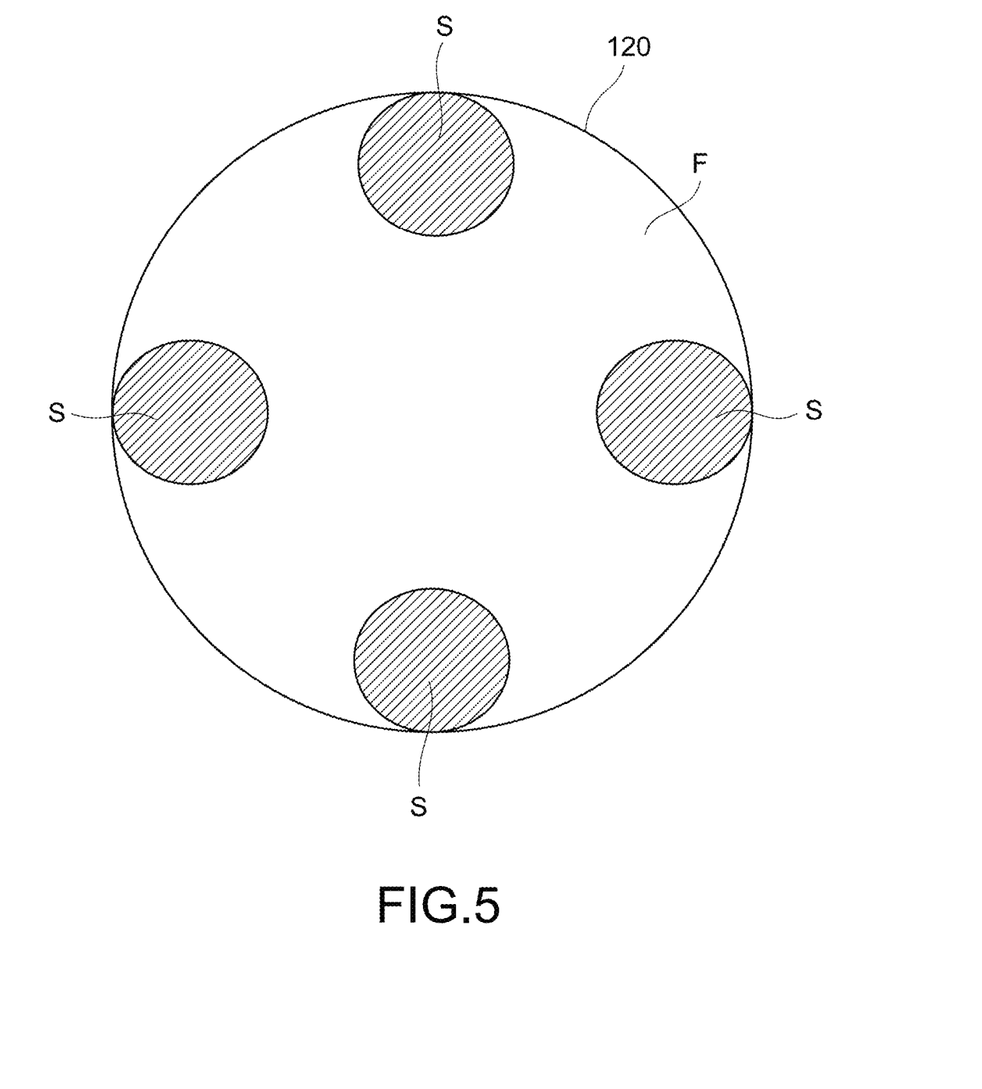
FIG. 5 is a view showing an arrangement example of the shield in the diffraction lens according to the present embodiment.
Figure 6:
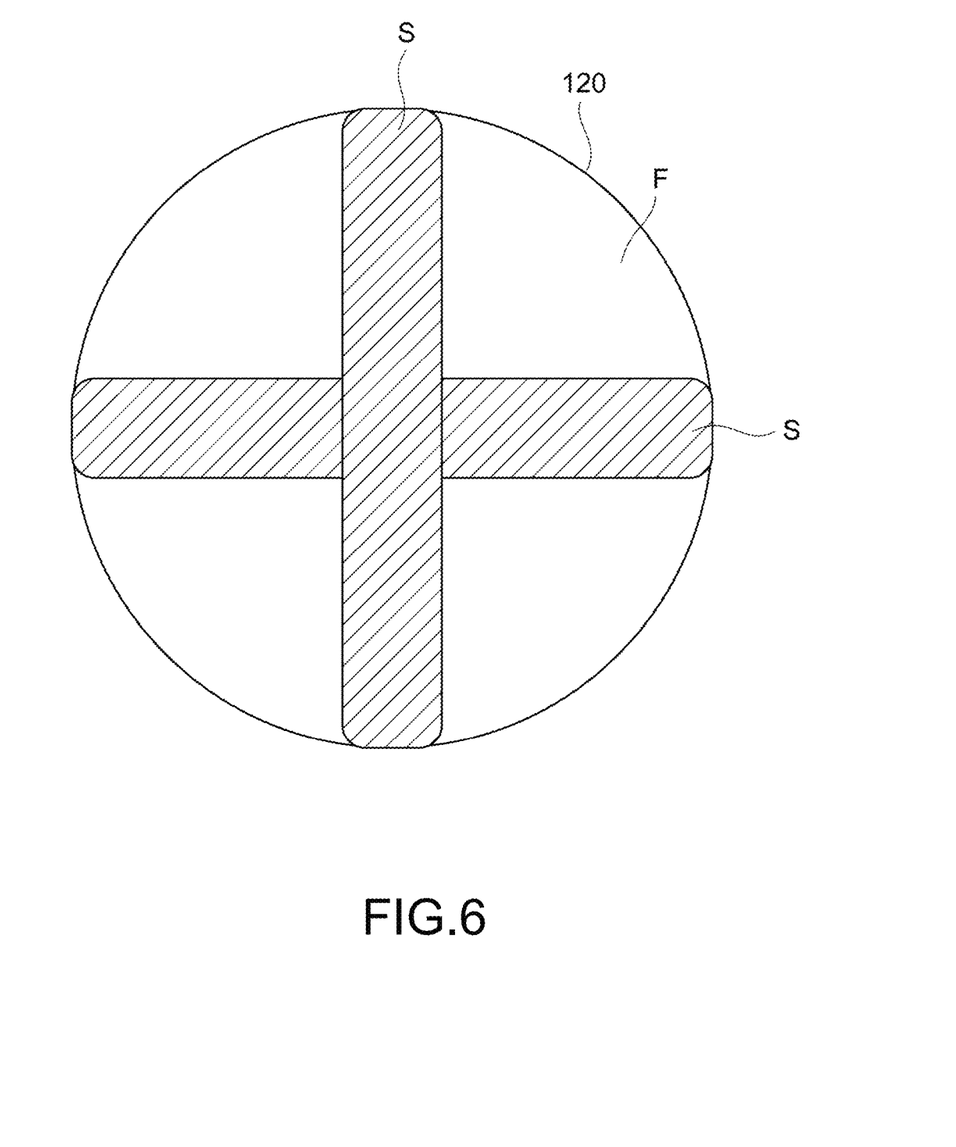
FIG. 6 is a view showing an arrangement example of the shield in the diffraction lens according to the present embodiment.
Figure 7:
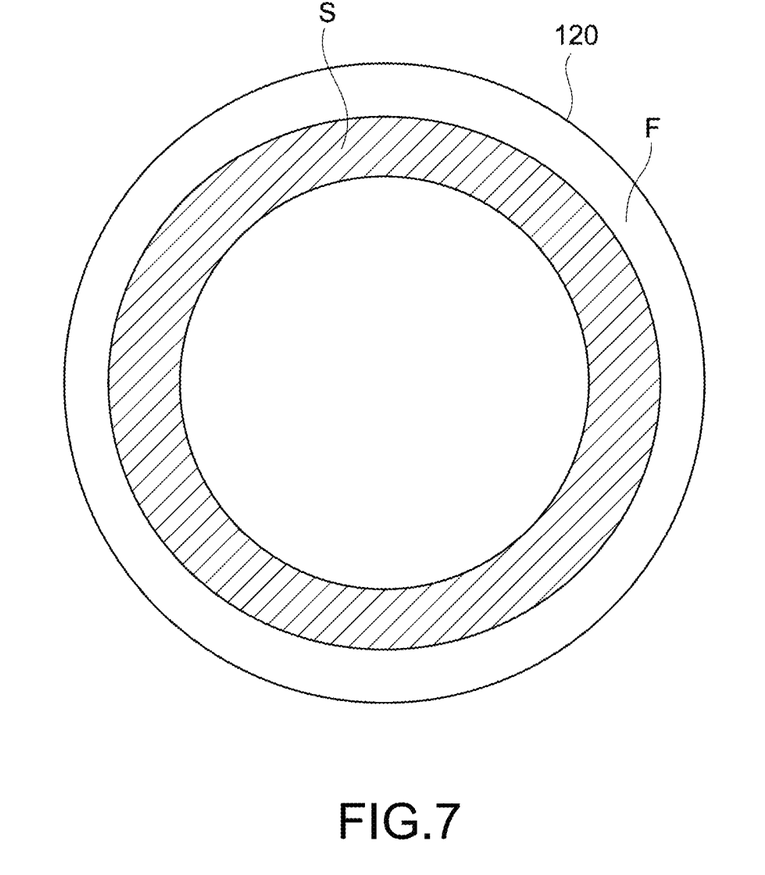
FIG. 7 is a view showing an arrangement example of the shield in the diffraction lens according to the present embodiment.

FIG. 5 to FIG. 7 are views showing examples in which a shield is arranged on a surface located on the side opposite to a diffraction surface formed with a diffraction pattern for generating chromatic aberration in the incident light along the direction of the optical axis in the diffraction lens according to the present embodiment. The surface located on the side opposite to the diffraction surface is preferably a plane surface but is not limited thereto.

As shown in FIG. 5, the shield S may be arranged in a four-way point pattern on a surface F of the diffraction lens 120. As shown in FIG. 6, the shield S may be arranged in a cross pattern on the surface F of the diffraction lens 120. As shown in FIG. 7, the shield S may be arranged in a ring pattern on the surface F of the diffraction lens 120.

Since the shield S is arranged on the surface F located on the side opposite to the diffraction surface in the diffraction lens 120 and, to arrange the shield S, it is not necessary to significantly change the original configuration of the optical measuring device, it is possible to further improve the detection accuracy of the position of the measurement object 200 at low costs.

In addition, since the shield S may be arranged in the four-way point pattern, the cross pattern, or the ring pattern on the surface F, the flexibility with respect to the arrangement of the shield S is increased.

The shield S is arranged corresponding to the arrangement of the plurality of cores 202 in the second optical fiber 12 shown in FIG. 1. Therefore, the arrangement of the shield S is not limited to the four-way point pattern, the cross pattern, and the ring pattern as long as crosstalk can be reduced. In addition, the range in which the shield S is arranged may be appropriately set according to the diameter of each of the cores 202 included in the second optical fiber 12, the intensity and spread of the emitted light, etc. Further, the thickness of the shield S may be appropriately set according to the material of the shield S, the content of the member, and the arrangement conditions of the lenses in the sensor head 100.

Also, since it suffices that the shield S is arranged between the conversion lens 110 and the objective lens 130 to inhibit light emitted from one core among the plurality of cores of the second optical fiber 12 from entering the cores other than the one core as the reflected light, the shield S is not limited to the arrangement on the surface F of the diffraction lens 120 but may be arranged on other lenses or other members in the sensor head 100.

Figure 8:
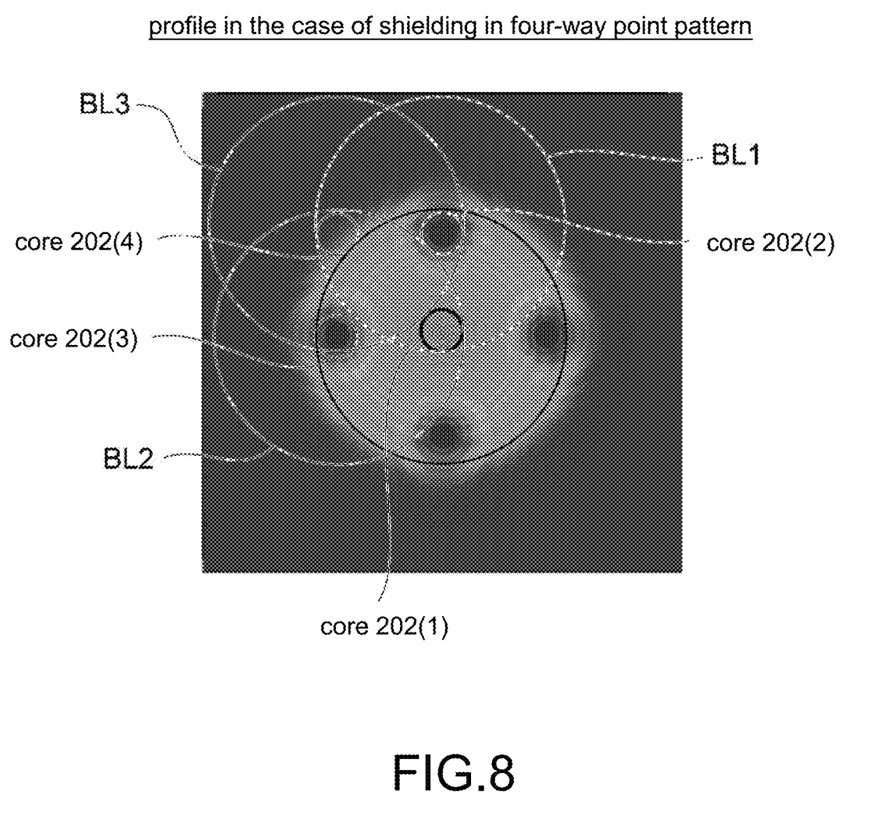
FIG. 8 is a view showing an example of the profile of the reflected light of the end face at the second optical fiber according to the present embodiment.

FIG. 8 to FIG. 10 are views showing examples of a profile of the reflected light at the end face of the second optical fiber according to the present embodiment. In particular, FIG. 8 is a view showing an example of the profile of the reflected light corresponding to the core 202(1) in the case where the shield S is arranged in the four-way point pattern on the surface F of the diffraction lens 120 as shown in FIG. 5. As shown in FIG. 8, the shield S is arranged in the four-way point pattern with respect to the arrangement of the core 202(1) in the second optical fiber, so that the reflected light is appropriately shielded. In FIG. 8, although the profiles with respect to the other cores 202(2) to 202(4) of the second optical fiber are not shown for ease of illustration, similar to the profile of the core 202(1), the profiles of the reflected light with respect to each of the cores 202(2) to 202(4) appear in the ranges indicated by broken lines BL1 to BL3 in FIG. 8.

Figure 9:
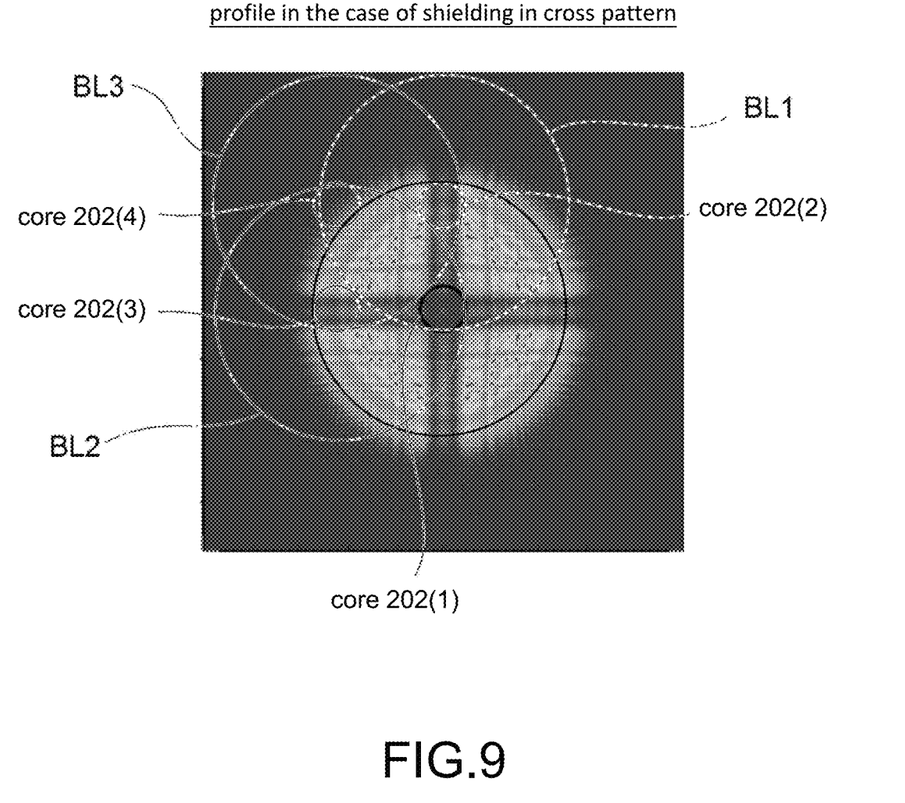
FIG. 9 is a view showing an example of the profile of the reflected light of the end face at the second optical fiber according to the present embodiment.

FIG. 9 is a view showing an example of the profile of the reflected light at the end face AS of the second optical fiber 12 shown in FIG. 1 in the case where the shield S is arranged in the cross pattern on the surface F of the diffraction lens 120 as shown in FIG. 6. In particular, FIG. 9 is a view showing an example of the profile of the reflected light corresponding to the core 202(1) in the case where the shield S is arranged in the cross pattern on the surface F of the diffraction lens 120 as shown in FIG. 6. As shown in FIG. 9, the shield S is arranged in the cross pattern with respect to the arrangement of the core 202(1) in the second optical fiber, so that the reflected light is appropriately shielded. Also in FIG. 9, although the profiles with respect to the other cores 202(2) to 202(4) of the second optical fiber are not shown for ease of illustration, similar to the profile of the core 202(1), the profiles of the reflected light with respect to each of the cores 202(2) to 202(4) appear in the ranges indicated by the broken lines BL1 to BL3 in FIG. 9.

Figure 10:
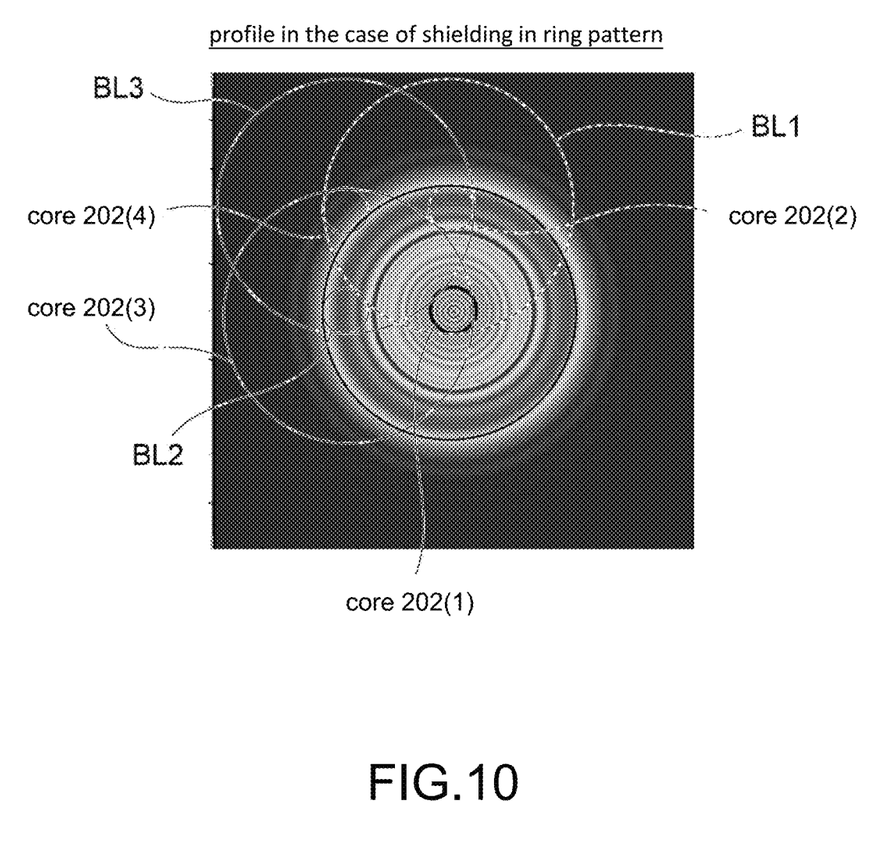
FIG. 10 is a view showing an example of the profile of the reflected light of the end face at the second optical fiber according to the present embodiment.

FIG. 10 is a view showing an example of the profile of the reflected light at the end face AS of the second optical fiber 12 shown in FIG. 1 in the case where the shield S is arranged in the ring pattern on the surface F of the diffraction lens 120 as shown in FIG. 7. In particular, FIG. 10 is a view showing an example of the profile of the reflected light corresponding to the core 202(1) in the case where the shield S is arranged in the ring pattern on the surface F of the diffraction lens 120 as shown in FIG. 7. As shown in FIG. 10, the shield S is arranged in the ring pattern with respect to the arrangement of the core 202(1) in the second optical fiber, so that the reflected light is appropriately shielded. Also in FIG. 10, although the profiles with respect to the other cores 202(2) to 202(4) of the second optical fiber are not shown for ease of illustration, similar to the profile of the core 202(1), the profiles of the reflected light with respect to each of the cores 202(2) to 202(4) appear in the ranges indicated by the broken lines BL1 to BL3 in FIG. 10.

Figure 11:
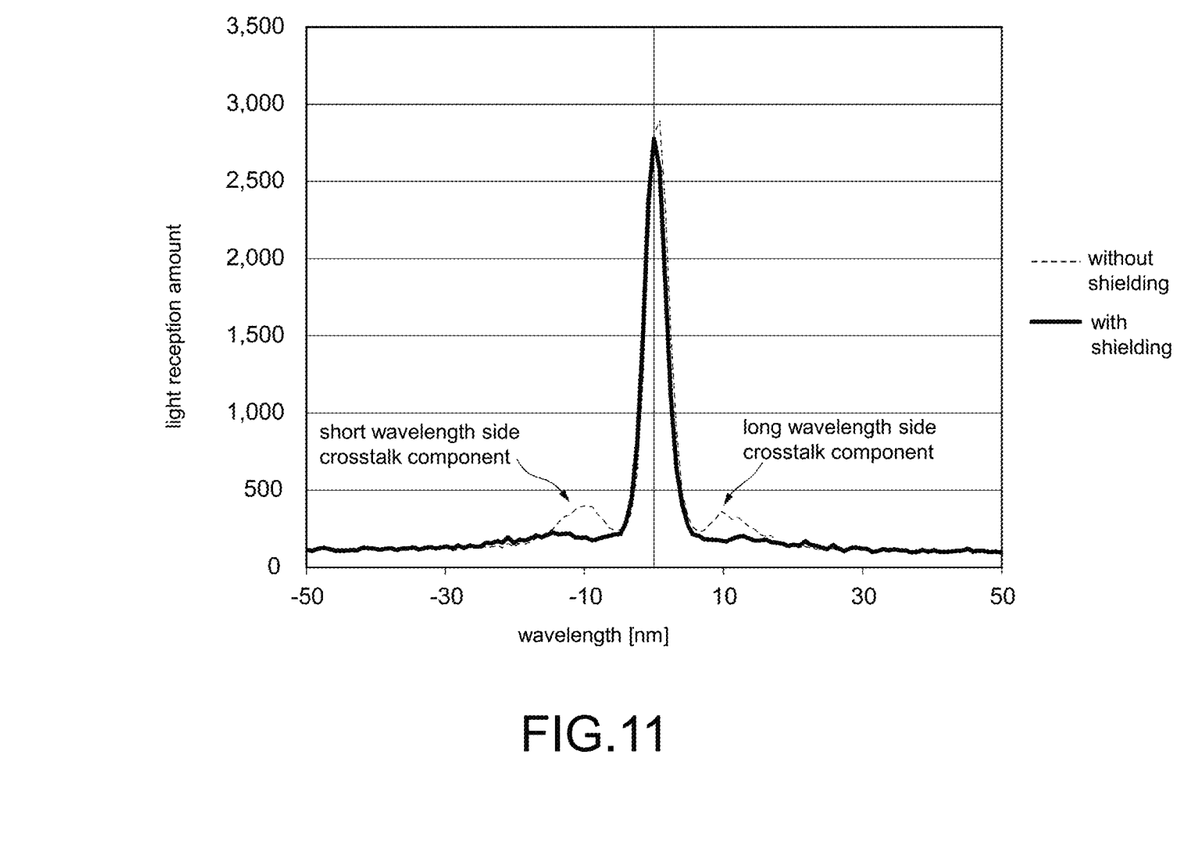
FIG. 11 is a view showing an example of the result of evaluation of the amount of crosstalk occurring in the confocal measuring device according to the embodiment of the disclosure.

FIG. 11 is a view showing a comparison example of evaluation of the amount of crosstalk occurring in the confocal measuring device according to the embodiment of the disclosure and the amount of crosstalk occurring in the confocal measuring device according to the conventional example. As shown in FIG. 11, compared with the confocal measuring device according to the conventional example, in the confocal measuring device according to the embodiment in which the shield is arranged in the four-way point pattern, it can be confirmed that crosstalk is reduced on both the long wavelength side and the short wavelength side. Also, in the case where the shield is arranged in the cross pattern or the ring pattern, similar results can be obtained.

As described above, according to the present embodiment, in the sensor head 100, the shield S that shields light is arranged between the conversion lens 110 and the objective lens 130 to inhibit the light emitted from one core 202 among the plurality of cores 202 included in the light guide part 50 from entering the cores 202 other than the one core 202 as the reflected light. Therefore, since crosstalk can be further reduced, the detection accuracy of the position of the measurement object 200 can be further improved.

OTHER EMBODIMENTS

Each of the above embodiments is intended to facilitate understanding of the disclosure and does not limit the interpretation of the disclosure. The disclosure may be changed/improved (for example, by combining the embodiments or omitting a part of the configuration of the embodiments) without departing from the spirit thereof, and the equivalents thereof are also included in the disclosure.

In the present embodiment, although the confocal measuring device 1 shown in FIG. 1 is exemplarily provided as an example of the optical measuring device, the disclosure is not limited thereto, and the optical measuring device may include, for example, another measuring device such as an interferometer having one or more cores that adopts a white interference method.

Part or all of the present embodiment may also be described as follows but is not limited to the following.

APPENDIX

An optical measuring device, including:
a light source (10), outputting a light of a plurality of wavelengths;
a sensor head (100), including a conversion lens (110) that converts the light incident via a light guide part (50), which includes a plurality of cores, into parallel light, and an objective lens (130) that irradiates the light in which chromatic aberration is generated to a measurement object (200); and
a spectroscope (30), acquiring reflected light reflected by the measurement object (200) and condensed by the sensor head (100) via the light guide part (50), and measuring a spectrum of the reflected light,
wherein in the sensor head (100), a shield (S) that shields light is arranged between the conversion lens (110) and the objective lens (130) to inhibit light emitted from one core among the plurality of cores included in the light guide part (50) from entering cores other than the one core as the reflected light.

What is claimed is:
1. An optical measuring device, comprising:
a light source, outputting a light of a plurality of wavelengths;
a sensor head, comprising a conversion lens and an objective lens, wherein the conversion lens converts the light incident via a light guide part into parallel light, and the objective lens irradiates the light in which chromatic aberration is generated to a measurement object; and
a spectroscope, acquiring reflected light reflected by the measurement object and condensed by the sensor head via the light guide part, and measuring a spectrum of the reflected light,
wherein the light guide part is formed by an optical fiber comprising four cores,
wherein in the sensor head, a shield that shields light is arranged between the conversion lens and the objective lens to inhibit light emitted from one core among the four cores included in the light guide part from entering cores other than the one core after being reflected by the measurement object as the reflected light, and wherein the shield is arranged in a four-way point pattern, a cross pattern, or a ring pattern.

2. The optical measuring device according to claim 1, wherein the shield is arranged corresponding to an arrangement of the plurality of cores.

3. The optical measuring device according to claim 2, wherein the sensor head accommodates a diffraction lens comprising a diffraction surface formed with a diffraction pattern, which is for generating chromatic aberration in the incident light along a direction of an optical axis, between the conversion lens and the objective lens, and the shield is arranged on a surface located on a side opposite to the diffraction surface in the diffraction lens.

4. The optical measuring device according to claim 3, wherein the light is a white light.

5. The optical measuring device according to claim 3, wherein the optical measuring device is a confocal measuring device that measures a displacement of the measurement object by using a confocal optical system.

6. The optical measuring device according to claim 2, wherein the light is a white light.

7. The optical measuring device according to claim 2, wherein the optical measuring device is a confocal measuring device that measures a displacement of the measurement object by using a confocal optical system.

8. The optical measuring device according to claim 1, wherein the sensor head accommodates a diffraction lens comprising a diffraction surface formed with a diffraction pattern, which is for generating chromatic aberration in the incident light along a direction of an optical axis, between the conversion lens and the objective lens, and the shield is arranged on a surface located on a side opposite to the diffraction surface in the diffraction lens.

9. The optical measuring device according to claim 8, wherein the light is a white light.

10. The optical measuring device according to claim 8, wherein the optical measuring device is a confocal measuring device that measures a displacement of the measurement object by using a confocal optical system.

11. The optical measuring device according to claim 1, wherein the light is a white light.

12. The optical measuring device according to claim 1, wherein the optical measuring device is a confocal measuring device that measures a displacement of the measurement object by using a confocal optical system.

* * * * *